United States Patent
Harada et al.

(10) Patent No.: US 6,581,160 B1
(45) Date of Patent: Jun. 17, 2003

(54) REVOCATION INFORMATION UPDATING METHOD, REVOCATION INFORMATION UPDATING APPARATUS AND STORAGE MEDIUM

(75) Inventors: Shunji Harada, Osaka-fu (JP); Makoto Tatebayashi, Takarazuka (JP); Masayuki Kozuka, Arcadia, CA (US); Teruto Hirota, Moriguchi (JP); Toru Kamibayashi, Chigasaki (JP); Masafumi Tamura, Chofu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 167 days.

(21) Appl. No.: 09/692,800

(22) Filed: Oct. 20, 2000

Related U.S. Application Data

(63) Continuation-in-part of application No. 09/436,035, filed on Nov. 8, 1999.

(51) Int. Cl.[7] .............................. H04L 9/00
(52) U.S. Cl. ...................... 713/169; 713/158
(58) Field of Search .................. 713/193, 194, 713/158; 705/51, 57

(56) References Cited

U.S. PATENT DOCUMENTS

| | | | | |
|---|---|---|---|---|
| 4,740,890 A | * | 4/1988 | William | |
| 5,400,319 A | * | 3/1995 | Fite et al. | 369/275.5 |
| 5,699,431 A | * | 12/1997 | Van Oorschot et al. | 380/30 |
| 5,805,551 A | * | 9/1998 | Oshima et al. | |
| 5,805,699 A | * | 9/1998 | Akiyama et al. | 380/4 |
| 5,949,877 A | * | 9/1999 | Traw et al. | 380/4 |
| 6,092,201 A | | 7/2000 | Turnbull et al. | |
| 6,128,740 A | * | 10/2000 | Curry et al. | 713/200 |
| 6,233,341 B1 | * | 5/2001 | Riggins | |
| 6,278,836 B1 | * | 8/2001 | Kawara et al. | |
| 2001/0021255 A1 | * | 9/2001 | Ishibashi | |
| 2002/0035492 A1 | * | 3/2002 | Nonaka | |

FOREIGN PATENT DOCUMENTS

| | | |
|---|---|---|
| EP | 930556 | 7/1999 |
| EP | 0930556 A2 * | 7/1999 |
| JP | 2000-357126 | * 12/2000 |
| JP | 2001-166996 | * 6/2001 |

OTHER PUBLICATIONS

"Trends in Digital Copy Protection Technologies," by K. Yamanaka et al., NTT Review, JP, Telecommunications Association, Tokyo, vol. 11, No. 1, Jan. 1999.

* cited by examiner

Primary Examiner—Gail Hayes
Assistant Examiner—Chi-Chung Lee

(57) ABSTRACT

A storage medium (PM) 13 includes a controller 130 and two types of storage regions, the concealed region 134 and the open region 131. The open region 131 includes an open RW 133 storing a digital content, an open ROM-W region 132a storing, as revocation information, identification information of an electronic appliance that is prohibited from accessing the digital content, and an open ROM region 132 storing, as master revocation information, identification information of an electronic appliance that is prohibited from updating the revocation information. When the storage medium is loaded into an electronic appliance that has identification information which is registered in the open ROM region 132, the controller 130 prohibits the electronic appliance from updating the revocation information.

18 Claims, 12 Drawing Sheets

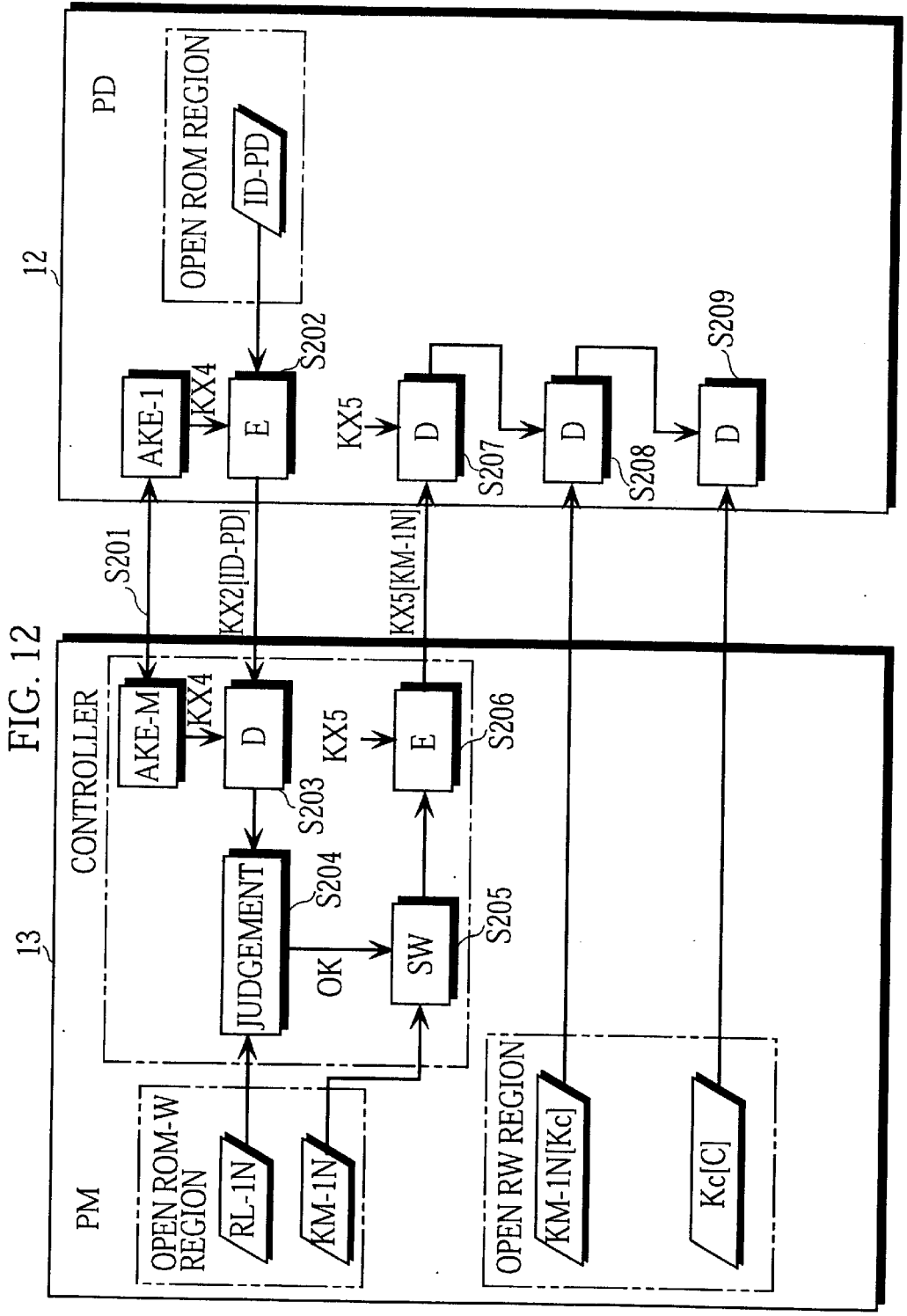

REVOCATION INFORMATION UPDATING METHOD, REVOCATION INFORMATION UPDATING APPARATUS AND STORAGE MEDIUM

This is a continuation-in part of application Ser. No. 09//436,035 filed Nov. 8, 1999

BACKGROUND OF THE INVENTION

1. Field of the Invention

The present invention relates to a storage medium used to store digital contents, such as programs and digitized text, audio and video, and to a method for updating revocation information that is used to prevent unauthorized electronic appliances from recording and reproducing digital contents.

2. Description of the Related Art

The advancements in digital and microprocessor technologies in recent years have enabled the development of a great variety of electronic appliances. Examples of such are personal computers with multimedia capabilities, set-top boxes, reproduction devices and game consoles. In addition to reproducing image data, audio data and other types of digital contents from recording media, such appliances can also download digital contents from networks like the Internet.

Digital contents are generally copyrighted material that has been digitally encoded according to a technique such as MPEG 2 (Moving Pictures Experts Group 2) or MP3 (Moving Pictures Experts Group—Audio Layer 3). Such contents can be copied and transmitted on networks with no loss in quality. This means there is a growing need for technologies to stop improper acts that violate the copyrights over such material.

Current electronic appliances such as personal computers, set-top boxes, and reproduction devices tend to use "reversible" recording media, which here refers to recording media that are not player-dependent. Such media operate according to specifications that are usually made public. This makes it possible for users to transfer or copy digital contents onto other media at will, so that there is no effective way of protecting a digital content recorded on a recording medium.

Memory cards, where a recording medium and a controller are integrated, have recently appeared on the market. Such cards can be provided with a protected region (hereinafter called a "concealed region") that can be accessed by an access control function of the controller according to a special procedure, but otherwise cannot be accessed by users. It is believed that digital contents can be protected more securely by using a concealed region to store important information (such as copy control information and transfer control information) that relates to the way in which digital contents can be used.

The following describes one conceivable way to protect the copyright of a digital content. Whenever a digital content is transferred between any of the electronic devices mentioned above and a recording medium, both devices first perform mutual authentication. This means that each device checks that the other is an authentic device equipped with the same copyright (content) protection mechanism (i.e., a predetermined content protection function). When both devices are authentic, they then exchange keys according to a key generation algorithm provided in both devices. Both devices thus obtain an authentication key, and use this key to respectively encrypt and decrypt either a content key (a different key used to encrypt the digital content), or the digital content itself.

The above technique has the following problem. The content protection mechanism (such as the information and/or program used for mutual authentication) has to be set in the electronic appliance before it is shipped from the factory. After purchase, the electronic appliance (or more specifically the programs that run on an electronic appliance) may be subjected to tampering which renders the content protection mechanism inoperative. Such a modified electronic appliance cannot be detected and stopped by mutual authentication alone, so that improper use of the contents becomes possible.

Digital contents could conceivably be afforded better protection by pre-recording revocation information in a special region on a recording medium. Revocation information shows invalid electronic appliances that should be prohibited from accessing contents stored on a recording medium. Such revocation information can be in the form of a list of identification information for such invalid electronic appliances. When the recording medium is loaded into an electronic appliance registered in the revocation information, the electronic appliance is prohibited from accessing the recording medium. In other words, the contents on the recording medium are protected by invalidating the electronic appliance's right to access the recording medium.

This method has a drawback in that it is still necessary to set such revocation information in a non-rewritable region before the recording medium is shipped from the factory. This means that if tampering with electronic appliances (or programs of such appliances) results in the appearance of new types of invalid electronic appliances after a recording medium has been produced, such appliances cannot be added to the revocation information on the medium. Illegal access by such appliances cannot be prevented.

SUMMARY OF THE INVENTION

The present invention was conceived in view of the above problem, and has an object of providing a storage medium that can refer to revocation information and prohibit access to a content by an unauthorized electronic appliance, even when the unauthorized electronic appliance appears after the storage medium has been manufactured. The invention also aims to provide a suitable revocation information updating apparatus and method for such medium.

The stated object can be achieved by a storage medium that is used having been loaded into an electronic appliance, the storage medium including: a content storage area for storing a digital content; a revocation information storage area for storing, as revocation information, information that corresponds to identification information of an electronic appliance that is prohibited from accessing the digital content stored in the content storage area; and a master revocation information storage area storing, as master revocation information, information that corresponds to identification information of an electronic appliance that is prohibited from updating the revocation information stored in the revocation information storage area.

With the stated construction, information corresponding to the identification information of unauthorized electronic appliances that should not be allowed to update the revocation information can be registered in advance in the master revocation information storage area of the storage medium. By referring to this information, the storage medium can know whether an electronic appliance that is trying to access the revocation information is an authorized appliance or an unauthorized appliance.

The revocation information is stored in a secure rewritable storage region, so that even when an unauthorized electronic appliance appears after the storage medium is manufactured, information corresponding to the identification information of the electronic appliance can be additionally registered in the revocation information storage region. In this way, the unauthorized electronic appliance can be prevented from accessing digital productions stored on the storage medium.

Here, the storage medium may further include: a content protecting unit for performing a first judgment as to whether an electronic appliance into which the storage medium has been loaded has identification information that corresponds to the revocation information stored in the revocation information storage region, and allowing the electronic appliance to access the digital content stored in the content storage region only if the first judgment is negative; and a revocation information updating unit for performing a second judgment as to whether the electronic appliance into which the storage medium has been loaded has identification information that corresponds to the master revocation information stored in the master revocation information storage region, and allowing the electronic appliance to update the revocation information stored in the revocation information storage region only if the second judgment is negative.

With the stated construction, only electronic appliances with identification information that does not correspond to the content of the master revocation information storage region are allowed to update the revocation information stored on the storage medium. This means that unauthorized electronic appliances can be prevented from tampering with the revocation information.

Here, the master revocation information storage region may be provided in a ROM (read only memory) in which the master revocation information is stored in advance.

This protects the storage medium from attacks that try to tamper with the master revocation information after the storage medium has been manufactured.

Here, the storage medium may further include: a mutual authentication unit for performing mutual authentication with the electronic appliance into which the storage medium has been loaded before the revocation information updating means performs the second judgment and, if the mutual authentication succeeds, for generating a secret key that can be shared with the electronic appliance, wherein the revocation information updating unit updates the revocation information using the secret key generated by .the mutual authentication unit With the stated construction, the crucial identification information relating to which devices have authorization to update the revocation information is transferred between the storage medium and an electronic appliance in a secure manner. This increases the security with which the revocation information is protected.

Here, the revocation information updating unit may transmit a secret key, which the electronic appliance needs to update the revocation information, to the electronic appliance only if the second judgment is negative.

As a result, the result of the judgment as to whether an electronic appliance has authority to update the revocation information is kept secret. This thwarts third parties that try to intercept the communication between the storage medium and an electronic appliance.

Here, the revocation information may be sorted into a plurality of groups, the revocation information storage region may include a plurality of storage areas, and each group may be stored in a different storage area, and as the second judgment, the revocation information updating means may judge (1) whether the electronic appliance into which the storage medium has been loaded has identification information that does not correspond to the master revocation information stored in the master revocation information storage region, and (2) whether the electronic appliance has identification information that does not correspond to the revocation information in a specified group of revocation information that the electronic appliance wishes to update, the second judgment being negative only when both (1) and (2) are affirmative, and the revocation information updating means allowing the electronic appliance to update only the revocation information in the specified group.

As a result, even when an unauthorized third party manages to tamper with the revocation information, the damage will be limited to one group of revocation information. Other groups of revocation information are unaffected.

The stated object can also be achieved by a method for updating revocation information on a storage medium, the method including: a detection step for detecting whether the storage medium has been loaded into an electronic appliance; a judgment step for performing a first judgment as to whether first identification information of the electronic appliance does not correspond to the master revocation information stored in the master revocation information storage region of the storage medium; and an updating step for updating the revocation information stored in the revocation information storage region only when the first judgment is affirmative.

The stated object can also be achieved by a revocation information updating apparatus for updating revocation information on a storage medium, the apparatus including: a first identification information storage unit for storing first identification information that does not correspond to the master restricted region stored in the master revocation information storage region of the storage medium; a permission obtaining unit for obtaining, using information corresponding to the first identification information stored in the first identification information storage means, permission from the storage medium to update the revocation information stored on the storage medium; and an updating unit for updating the revocation information stored on the storage medium in accordance with the permission obtained by the permission obtaining unit.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 12 shows the communication between the PM and the PD and the processing flow.

DESCRIPTION OF THE PREFERRED EMBODIMENT

The following describes an embodiment of the present invention with reference to the attached figures.

Figure 1:
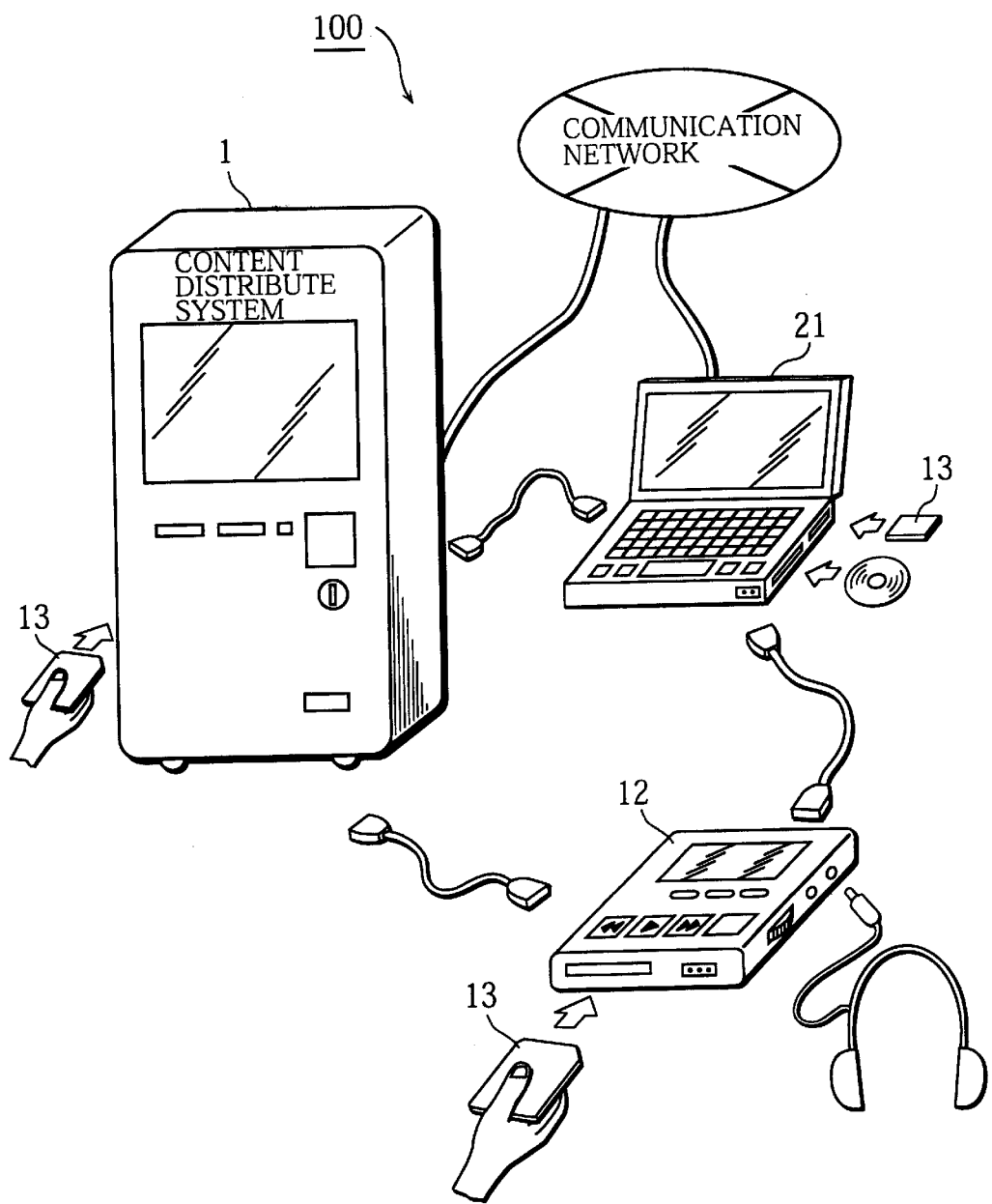
FIG. 1 shows the overall construction of a copyright protection system that is an embodiment of the present invention.

FIG. 1 shows the construction of a copyright protection system 100 according to the present embodiment.

This copyright protection system 100 protects the copyrights over digital material that is distributed electronically or through the use of recording media. As shown in FIG. 1, the copyright protection system 100 is composed of a content distribute system (CDS) 1 in the form of a vending machine that electronically distributes music contents via a communication network such as the Internet, a recording medium (hereinafter portable media (PM)) 13 for storing music contents, a recording/playback apparatus (hereinafter, portable device (PD)) 12 that is portable and can record music contents onto the PM 13 and playback music contents from PM 13, and a content usage control system (hereinafter, license compliant module (LCM) 21) that manages the recording, playback and transfer of music contents.

The CDS 1, the PM 13, and the PD 12 are equipped with a function or construction that updates the revocation information described above to prevent unauthorized electronic appliances from making improper accesses to digital productions, even if the existence of such unauthorized appliances is discovered after the manufacture of the CDS 1, the PM 13, the PD 12, and the LCM 21.

Figure 2:
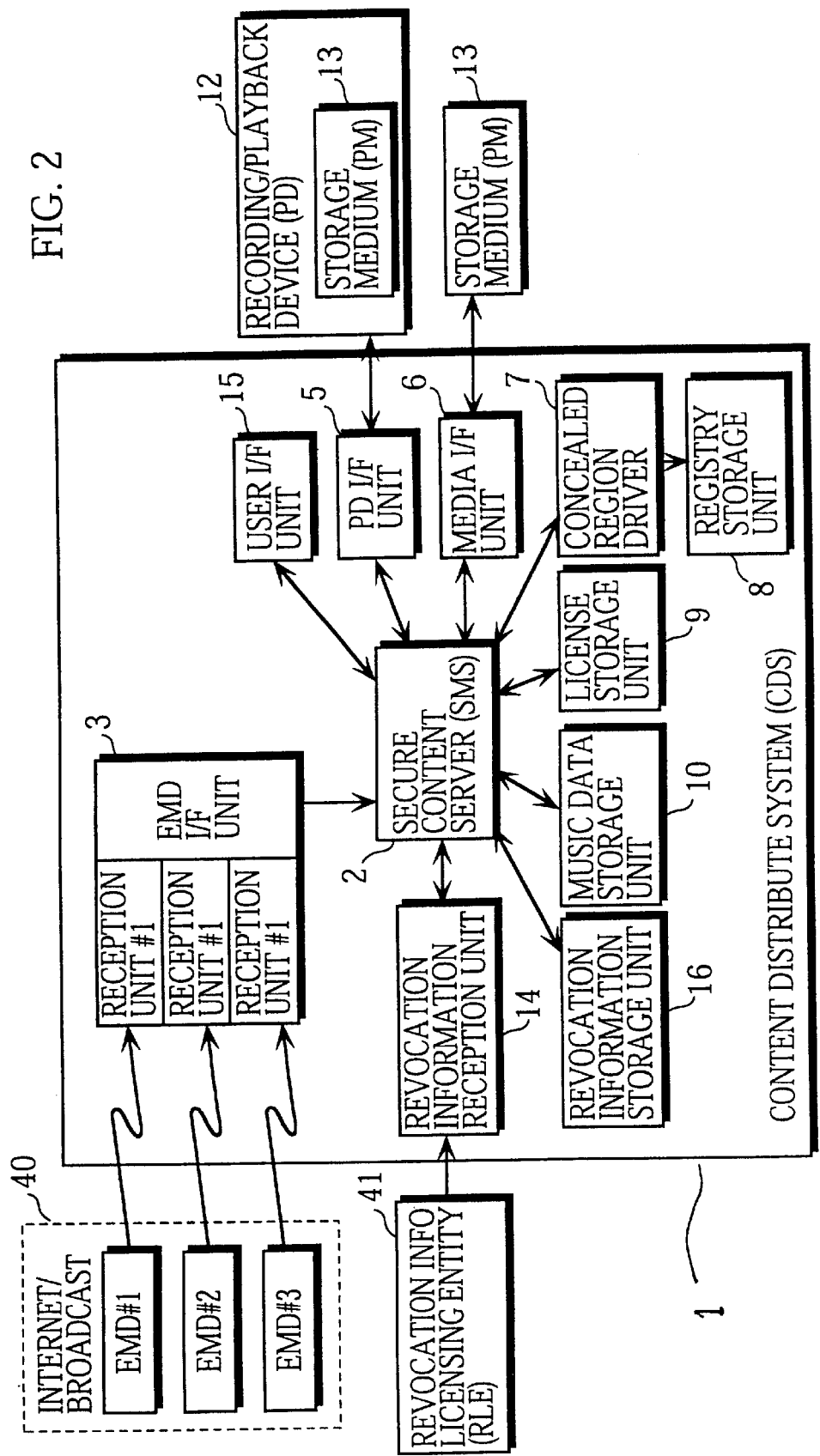
FIG. 2 is a block diagram showing the construction of a content distribute system (CDS)

FIG. 2 is a block diagram showing the construction of the CDS 1. The frame numbered 40 represents an electronic music distributor (EMD), such as a music server or broadcast station. The frame numbered 41 represents a revocation information licensing entity (RLE). When an unauthorized electronic appliance is newly discovered, this RLE 41 issues new revocation information including identification information for that electronic appliance.

The CDS 1 can be realized by a specialized terminal (such as a kiosk terminal) and can be located in a record shop as one example. This CDS 1 is connected to the EMDs 40 and RLE 41 via transfer paths, and is composed of a secure music server (SMS) 2, an EMD_I/F (interface) unit 3, a PD_I/F unit 5, a media_I/F unit 6, a concealed region driver 7, a registry storing unit 8, a license storing unit 9, a music data storing unit 10, a revocation information receiving unit 14, a user I/F unit 15, and a revocation information storing unit 16.

The functions of the CDS 1 are described below.
(1) Content Recording (Purchasing) Function The CDS 1 records a content indicated by the user onto a PM 13 loaded into the CDS 1. This corresponds to when the user purchases the content.
(2) Revocation Information Updating Function The CDS 1 updates the revocation information on a PM 13 loaded into the CDS 1. This revocation information shows which electronic appliances should be invalidated.

The EMD_I/F unit 3 is a communication adapter or the like for connecting the CDS 1 to a plurality of EMD 40. The PD_I/F unit 5 is a USB (Universal Serial Bus) or the like that connects a PD 12 to the CDS 1. The media_I/F unit 6 is a PCMCIA (Personal Computer Memory Card International Association) card slot or the like for loading a PM 13 into the CDS 1. The revocation information receiving unit 14 is a communications adapter, or the like, which receives revocation information that is to be newly registered. The user I/F unit 15 includes an LCD (liquid crystal display) and switches, button keys, or the like.

The music data storing unit 10 is a flash memory for storing encrypted music contents. The registry storing unit 8 is a memory storing attribute information and the like for the music contents stored in the music data storing unit 10.

The license storing unit 9 is a memory for storing a key, or other such information, that is used when decrypting an encrypted music content stored in the music data storing unit 10. The revocation information storing unit 16 is a memory for temporarily storing revocation information, such as revocation information received from the RLE 41.

The concealed region driver 7 is a control circuit, or the like, for accessing the protected storage regions (described later) of the registry storing unit 8 and the like using a confidential procedure that is not made public. The SMS 2 is a CPU (Central Processing Unit) or the like for executing processing that controls the other components to achieve the two functions mentioned above.

The following describes the functions of the components of the CDS 1 and the control performed by the SMS 2 separately for the two functions (1) and (2) given above.
(1) Content Recording (Purchasing) Function In the CDS 1, contents are protected against unauthorized use by having the contents encrypted and decrypted using identification information (a media ID) of each recording medium (PM 13) onto which the contents are recorded.

The CDS 1 includes three reception units numbered #1 to #3 that each correspond to one of the three EMDs 40 also numbered #1 to #3. Encrypted contents (in the present example, music contents) and license information (usage conditions, encrypted content decryption keys etc.) distributed by the three EMDs 40 are received via the corresponding reception units #1 to #3. The encrypted contents distributed by the each EMD 40 can be produced using different encryption methods and different audio encoding methods. Each of the receiving units #1 to #3 may also be equipped with functions for playing back received audio and for billing the user. This billing function enables the user to purchase contents as desired.

The SMS 2 receives, via the EMD_I/F unit 3, encrypted contents that have been purchased by the user. When necessary, the EMD_I/F unit 3 decrypts encrypted contents that have been subjected to the audio encoding and encryption methods used by the different EMDs 40 and converts (re-encrypts) the contents using an audio coding format and encryption format used by the CDS 1.

On receiving an encrypted content, the SMS 2 stores the encrypted content in the music data storing unit 10 and stores the key (the encrypted content decryption key) for decrypting the encrypted content in the license storing unit 9. The SMS 2 may be provided with a playback function to allow users to listen to a music content that has been distributed. When this is the case, the music contents managed by the SMS 2 may be reproduced on the CDS 1.

The SMS 2 is equipped with a function for outputting an encrypted content (music content) stored in the music data storing unit 10 via the media_I/F unit 6 to a PM 13, such as a memory card, that is loaded into the media_I/F unit 6.

By setting a PM 13 in the PD 12, the user can have the encrypted contents (music contents) recorded on the PM 13 decrypted and played back by the PD 12. The SMS 2 can record contents on the PM 13 either directly via the media_ I/F unit 6 or indirectly via the PD 12.

The user can also set the PM 13 in the LCM 21. The LCM 21 decrypts and plays back the encrypted (music) contents recorded on the PM 13. Alternatively, the user can have the encrypted (music) contents on the PM 13 transferred onto the LCM 21 for storage in the LCM 21 thereafter.

(2) Revocation Information Updating Function

The revocation information is used to identify electronic appliances (PDs, LCMs, etc.) that should be invalidated from using a PM 13 in order to protect the contents on the PM 13. Here, "using a PM 13" means recording contents on a PM 13 or reading and/or playing back contents recorded on a PM 13. This revocation information is prerecorded on a PM 13 during manufacture.

The revocation information updating function is performed by an electronic appliance that has special permission (CDS 1 in the present example). When necessary, this function uses new revocation information to update the revocation information that was recorded on a PM 13 during manufacture. The revocation information needs to be updated when unauthorized appliances that should be invalidated are newly discovered.

The CDS 1 is equipped with a revocation information receiving unit 14 that receives new revocation information from the RLE 41. The new revocation information transferred from the RLE 41 to the CDS 1 is encrypted to prevent tampering on the transfer path between the two devices. As one example, this encryption may use an encryption key that is shared by the RLE 41 and the CDS 1 beforehand.

The SMS 2 receives the encrypted new revocation information that has been issued by the RLE 41 via the revocation information receiving unit 14. The SMS 2 decrypts the encrypted new revocation information and stores the resulting new revocation information in the revocation information storing unit 16. When a PM 13, such as a memory card, is loaded into the media_I/F unit 6 (i.e., when the media_ I/F unit 6 detects that a PM 13 has been inserted), a function provided in the SMS 2 has the new revocation information in the revocation information storing unit 16 outputted to the PM 13 via the media_I/F unit 6. The SMS 2 can record new revocation information on a PM 13 directly via the media_ I/F unit 6 or indirectly via a PD 12.

The following describes the various types of revocation information. Note that the recording media (here, PM 13) is not limited to the storage of digitized music, and may alternatively be used for recording an application system, like a so-called "electronic book". In this case, revocation information is issued for each application system. As a result, electronic appliances can be revoked separately for each of the application systems and so that only electronic appliances with special permission for a given application system can be allowed to update the revocation information corresponding to that application system. In the present example, the CDS 1 is permitted to update only the revocation information for electronic appliances (e.g., PD, LCM) that handle digitized music.

With this arrangement, even if a user tampers with the revocation information updating function of the CDS 1, this will not affect other application systems as the user will still be prevented from updating the revocation information of other application systems.

It is also possible to revoke an electronic appliance, such as the CDS 1, that has the special permission to update the revocation information using special revocation information (hereafter called "master revocation information") that is registered on a PM 13. In other words, master revocation information showing the special electronic appliances that have special permission to update the revocation information can also be introduced into the copyright protection system 100 as a blacklist of unauthorized electronic appliances that would otherwise be capable of changing the revocation information.

As one example, suppose that the revocation information updating function of a particular CDS 1 is modified so as to allow unauthorized use. Information that identifies this type of CDS 1 can be added to the master revocation information so as to prevent the modified CDS 1 accessing the revocation information. This makes it possible to prevent unauthorized tampering with the revocation information.

Note that in the present embodiment, the master revocation information is assumed to be updated using a different method to the updating method disclosed by the present invention. The master revocation information is instead updated by issuing a recording medium on which the new master revocation information is recorded and then using this medium to replace an old recording medium on which the old master revocation information was recorded.

FIG. 2 is a block diagram showing the construction of the CDS 1. This device is capable of recording and playback.

Figure 3:
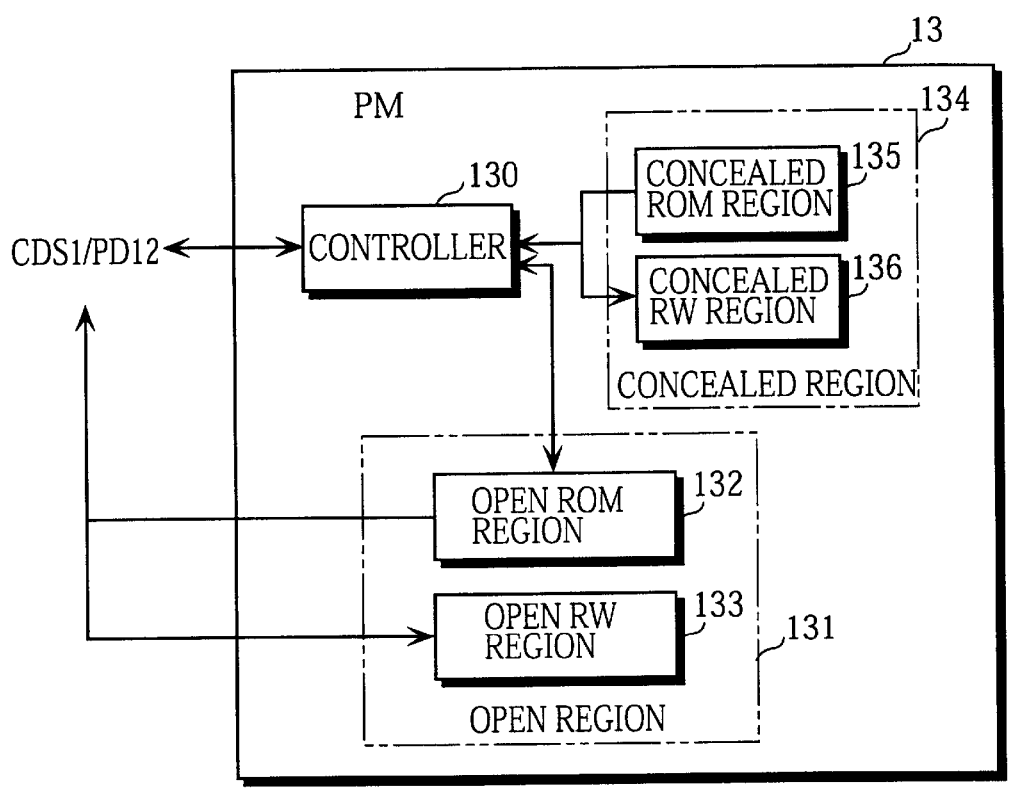
FIG. 3 is a block diagram showing the construction of a PM (recording medium)

FIG. 3 is a functional block diagram showing the construction of the PM 13. As shown in the diagram, the PM 13 includes a controller 130 and a recording medium part that is made up of an open region 131 and a concealed region 134.

The concealed region 134 is a logical storage region that can only be accessed via the controller 130 using a secret procedure. This concealed region 134 is used to store information that is required when decrypting a content. As shown in FIG. 3, the concealed region 134 is made up of a concealed ROM region 135 in which a secret constant (such as the unique master media key KM-M that is described later) is stored and a concealed rewritable (RW) region 136 that stores secret variables (such as a license decrypting key (described later) supplied by the licenser, a content decrypting key that has been encrypted, and a unique media key KM-1). This content decrypting key that has been encrypted (hereafter called the "encrypted content key") is produced by encrypting the content key KC used for decrypting the content C using the unique media key KM-1 that is unique to the PM 13.

The unique master media key KM-M and the unique media key KM-1 need to be set at different values for each PM 13, with it being possible to use different kinds of identification information for each PM 13, such as a serial number or a product number (the product number of each PM 13 or the production lot number). However, the KM-M and KM-1 may instead be produced from unique identification information of the PM 13 and the license decryption key. As examples, the concealed ROM region 135 can be physically provided in ROM (i.e., read only non-volatile memory), while the concealed RW region 136 can be provided in a flash memory (i.e., a rewritable non-volatile memory).

Figure 4:
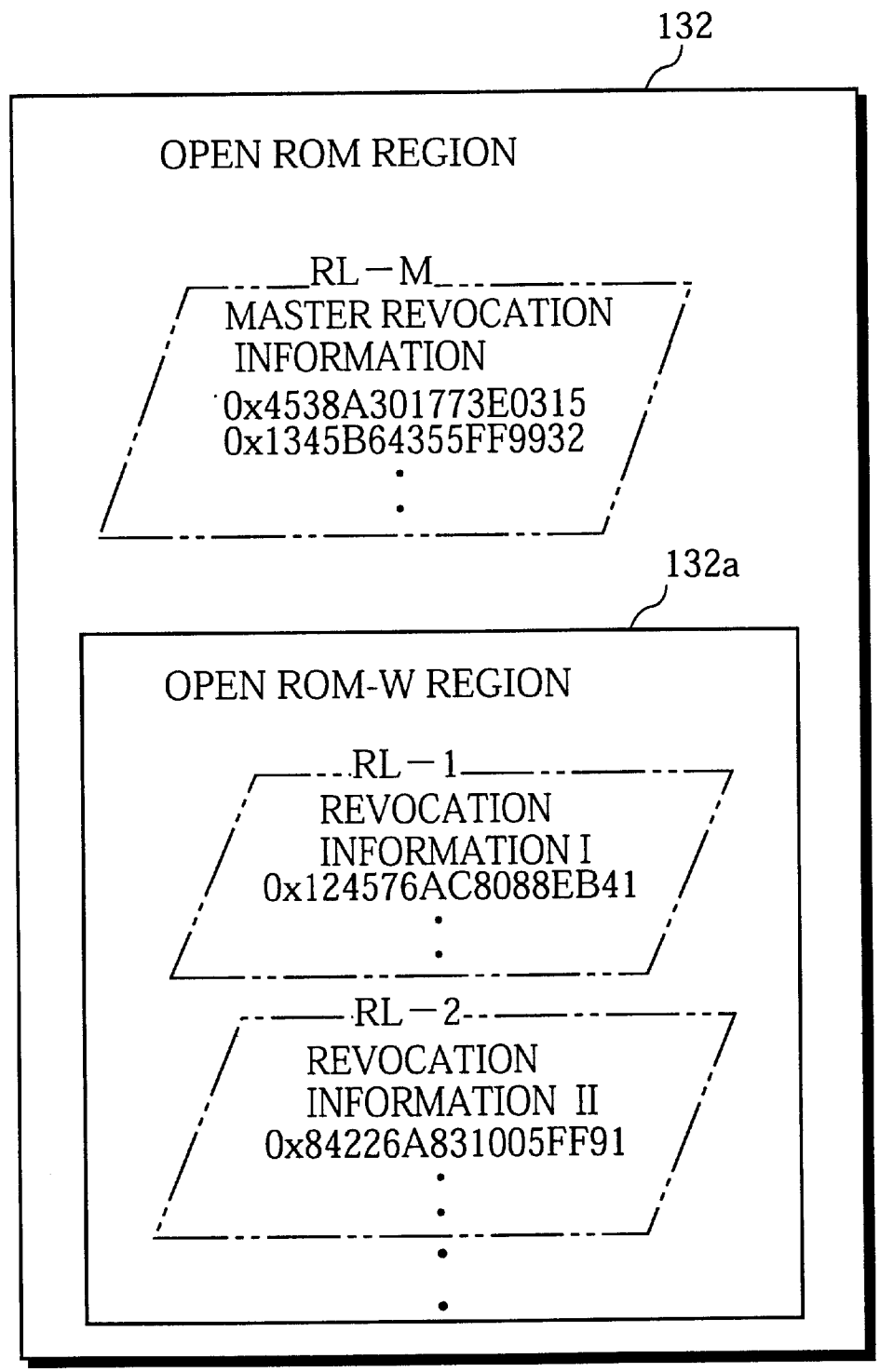
FIG. 4 shows the composition and recorded content of an open ROM region of a PM.

The open region 131 is separate from the concealed region and can be accessed by conventional procedures. This open region 131 is composed of a read-only open region 132 (hereafter called the "open ROM region") and a rewritable open region 133 (hereafter called the "open RW region"). As shown in FIG. 4, it is assumed that the open ROM region 132 also includes a region (hereafter called the "open ROM-W region 132a") that can be only be rewritten according to a secret procedure.

FIG. 4 shows the composition of the open ROM region 132 of the PM 13 and its stored content. As one example, the open ROM region 132 can physically provided within a ROM, for example, while the open RW region 133 and the open ROM-W region 132a can be physically provided within a flash memory. The open ROM region 132, the open RW region 133, and the open ROM-W region 132a may be respectively provided in the same ROM as the concealed ROM region 135 and the same flash memory as the concealed RW region 136.

The master revocation information (RL-M) is registered in advance in the open ROM region 132 (hereafter used to mean parts of the open ROM region 132 that are not the open ROM-W region 132a) before the PM 13 is shipped from the factory. One or more sets of revocation information (RL-1, RL-2 . . . ) are also registered in advance in the open ROM-W region 132a before shipping. Such sets of revocation information can be replaced (updated) by executing the revocation information updating function of the CDS 1 (or the like), which results in new revocation information being written into the open ROM-W region 132a via the controller 130 of the PM 13 according to a secret procedure. Note that one or more sets of revocation information that do not need to be updated according to the method of the present invention may also be registered in advance in the open ROM region 132.

In the present embodiment, the master revocation information and the one or more sets of revocation information are lists of identification information (64-bit device IDs) of electronic appliances that should be revoked. As a result, the following explanation will refer to each set of revocation information as a "revocation list RL". The master revocation information will be referred to as "RL-M", and each set of revocation information as "RL-1", "RL-2" etc. In this example, the revocation list RL-1 is used to revoke electronic appliances (such as a PD or an LCM) that record or play back digitized music.

Contents that have been encrypted (hereafter simply "encrypted contents") and other data are stored as required in the open RW region 133. These contents are encrypted using the content key KC.

Figure 5:
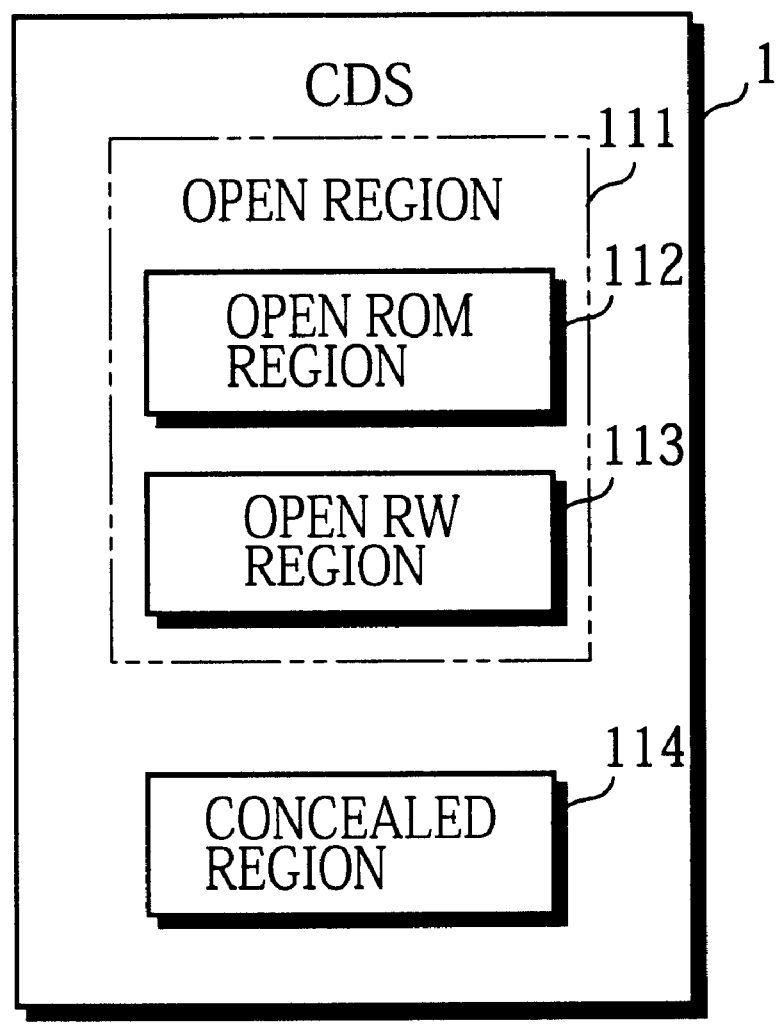
FIG. 5 shows the logical storage regions of the CDS.

FIG. 5 shows the logical storage regions of the CDS 1. The CDS 1 has an open region 111, which is made up of the open ROM region 112 and the open RW region 113, and a concealed region 114 that can only be accessed according to a secret procedure. The music data storing unit 10 shown in FIG. 2 is provided in the open RW region 113. The open ROM region 112 includes an open ROM-W region (not illustrated) in which the revocation information storing unit 16 shown in FIG. 2 is provided. In this embodiment, the SMS 2 shown in FIG. 2 decrypts the encrypted new revocation information that is received from the RLE 41 and stores the decrypted new revocation information into this open ROM-W region using a secret procedure.

The identification information (device ID) ID_CDS is stored in advance in the concealed region 114. A content key KC for each content is also stored as necessary in the concealed region 114. The concealed region 114 also provides the registry storing unit 8 shown in FIG. 2. All of the music contents that are stored in the music data storing unit 10 (in the open RW region 113) and are managed by the SMS 2 have a content ID (TID) and other such identification information as their attributes. This attribute information is called the "registry" and is stored in the registry storing unit 8 (provided in the concealed region 114).

The CDS 1 has a concealed region driver 7 that performs a special secret procedure to enable the SMS 2 to access the registry storing unit 8 in the concealed region 114 and then read data from the registry storing unit 8. Note that the registry has no direct bearing on the present invention, and so its use will not be described in detail.

The PD 12 includes an open region 121, made up of the open ROM region 122 and the open RW region 123, and a concealed region 124 that can only be accessed by a secret procedure. The identification information ID_PD of the PD 12 is permanently registered in the concealed region 124. A content key KC for each content is also stored in the concealed region 124.

Figure 6:
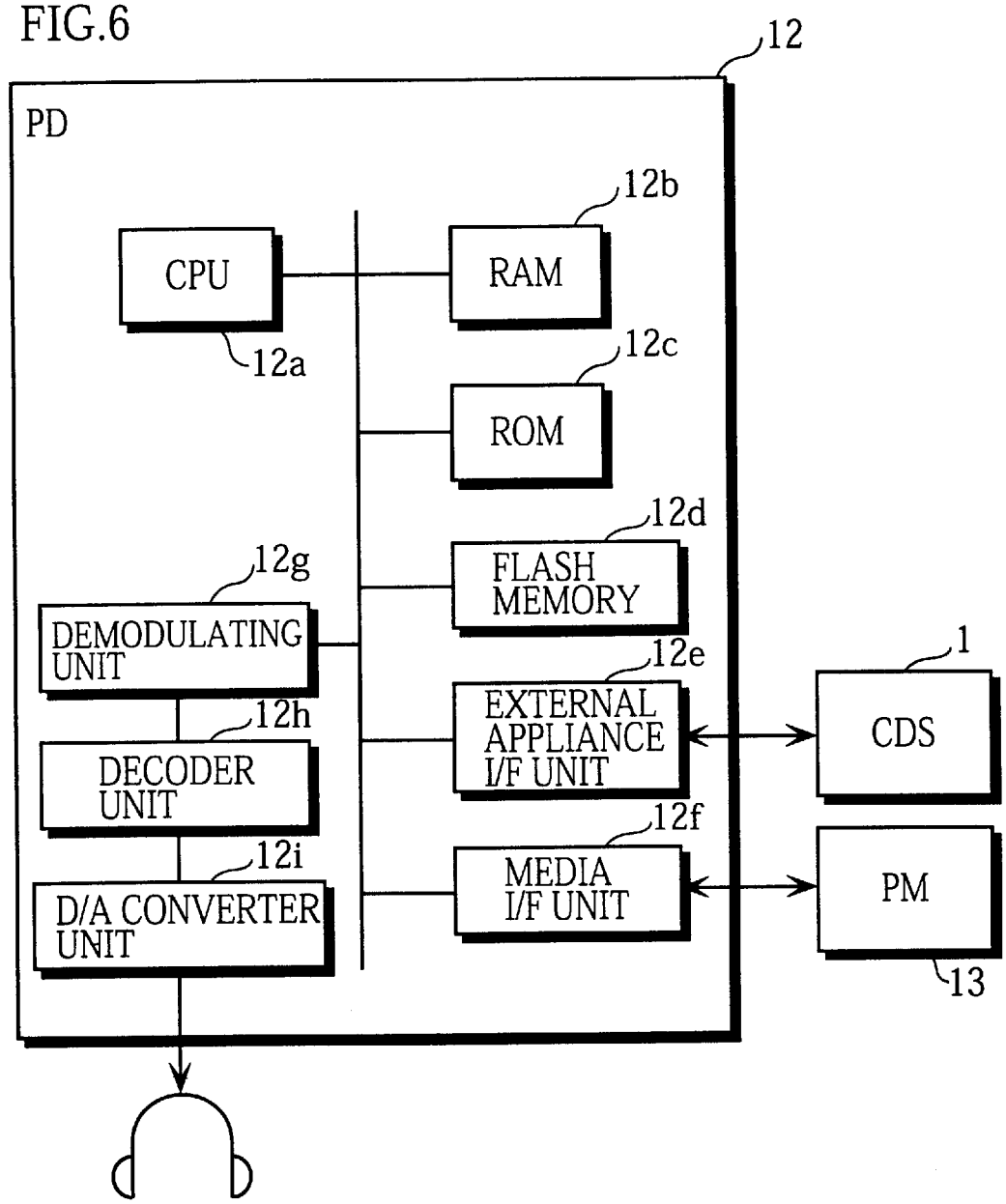
FIG. 6 is a block diagram showing the construction of a recording/playback apparatus (portable device (PD))
Figure 7:
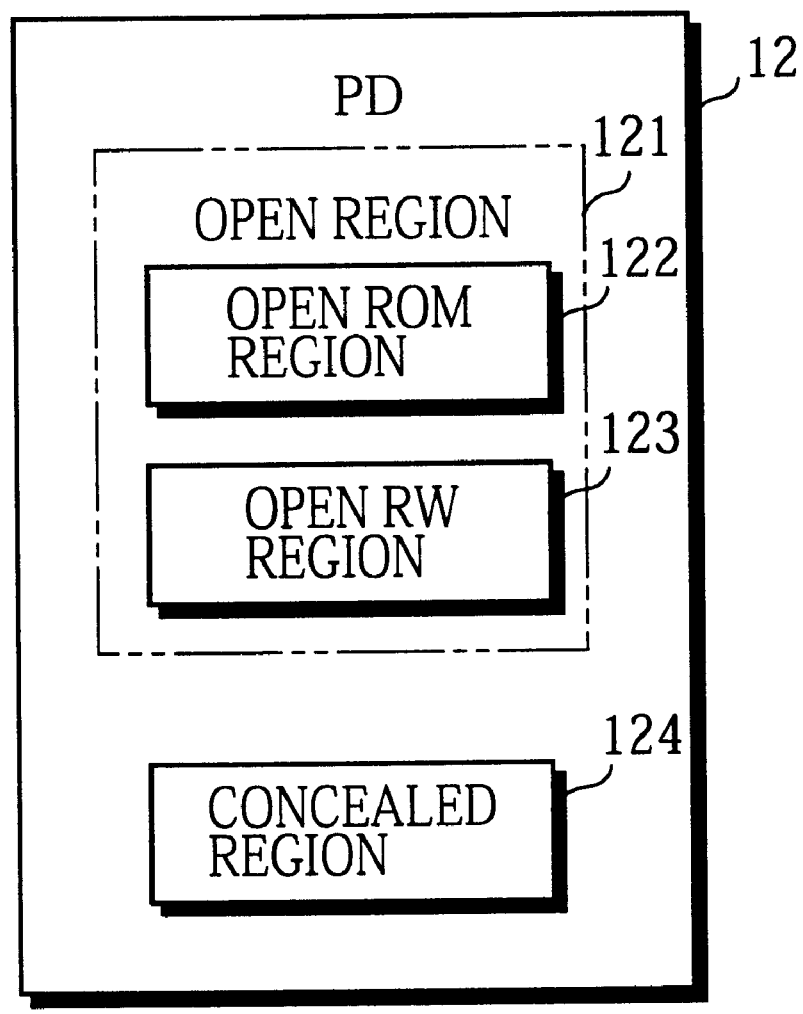
FIG. 7 shows the logical storage regions of the PD.

FIG. 6 is a block diagram showing the construction of the PD 12. FIG. 7 shows the logical storage regions provided in the PD 12.

The PD 12 is a semiconductor audio playback device or the like. As shown in FIG. 6, the hardware construction of the PD 12 includes a CPU 12a, a RAM 12b, a ROM 12c, a flash memory 12d, an external appliance I/F unit 12e, a media_I/F unit 12f, a demodulating unit 12g for decrypting encrypted music contents and the like, and a decoder unit 12h and D/A converter unit 12i for decoding and processing compressed audio contents. As shown in FIG. 7, the PD 12 is provided with an open region 121 and a concealed region 124.

The PM 13 is used having been into the media I/F unit 12f of the PD 12, as shown in FIG. 6. When the CDS 1 reads or writes data via the PD 12, the PD I/F unit 5 provided in the CDS 1 accesses the concealed region 134 (see FIG. 3) of the PM 13 via the external appliance I/F unit 12e and the media I/F unit 12f of the PD 12.

The media I/F unit 12f has a concealed region access unit (not illustrated) for accessing the concealed region 134 of the PM 13. The open RW region 123 and the concealed region 124 of the PD 12 are provided, for example, in a flash memory. A program that enables mutual authentication to be performed with the PM 13 is written in this ROM 12c. The PD 12 operates in accordance with this program under the control of the CPU 12a to perform mutual authentication with the PM 13.

Figure 8:
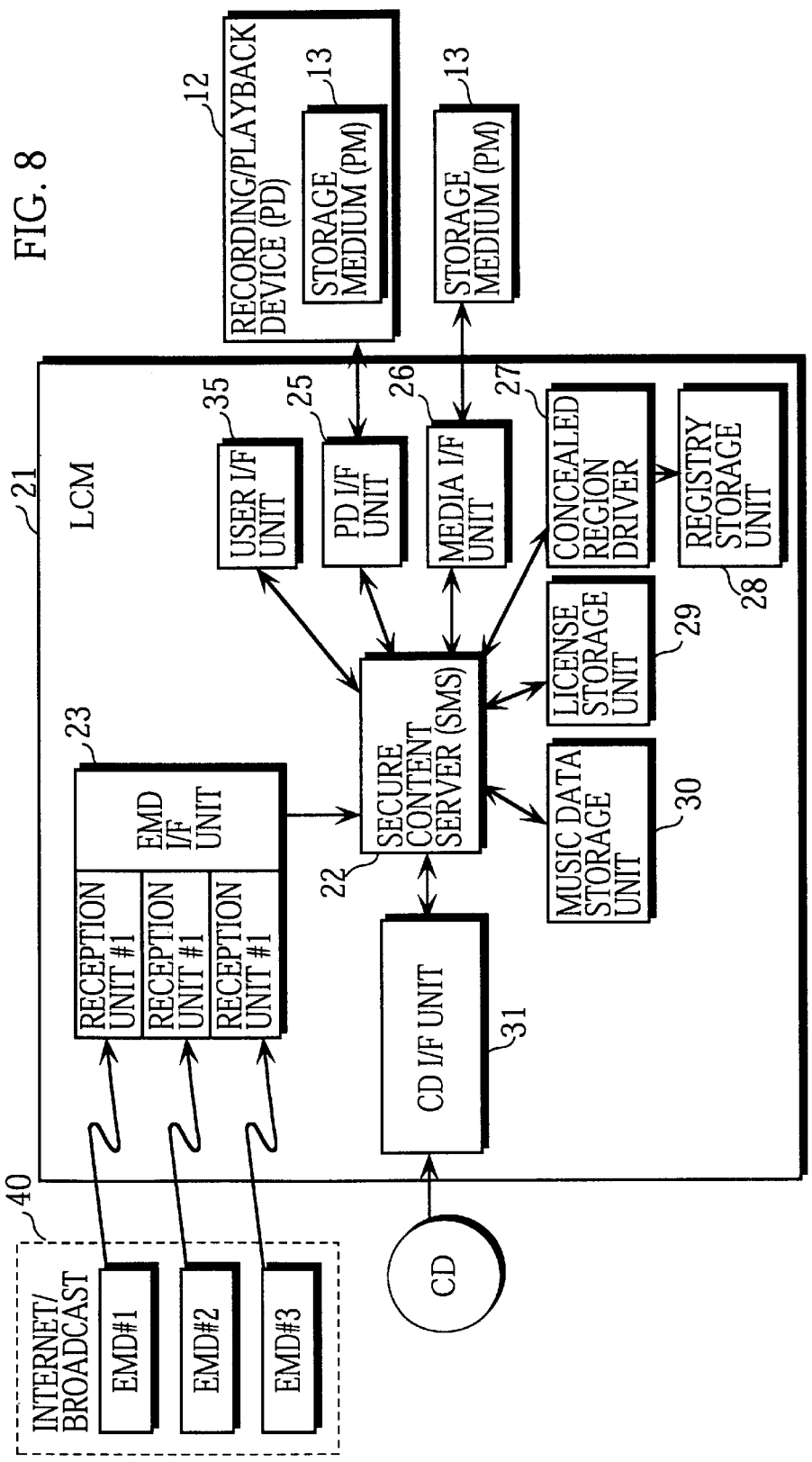
FIG. 8 is a block diagram showing the construction of a content usage management system (License Compliant Module (LCM))

FIG. 8 is a block diagram showing the construction of the LCM 21. The LCM 21 is realized by a personal computer and, with the exception of the function for updating the revocation information, has fundamentally the same construction as the CDS 1. In other words, the LCM 21 includes an SMS 22, an EMD_I/F unit 23, a PD_I/F unit 25, a media_I/F unit 26, a concealed region driver 27, a registry storing unit 28, a license storing unit 29, a music data storing unit 30, a CD_I/F unit 31, and a user I/F unit 35. Like the CDS 1, the LCM 21 has the following functions. The LCM 21 can receive an encrypted content from an EMD 40 and store the content within the LCM 21. The LCM 21 can record an encrypted content stored within the LCM 21 onto a PM 13 or read a music content from a PM 13 and thereafter store the content within the LCM 21.

Figure 9:
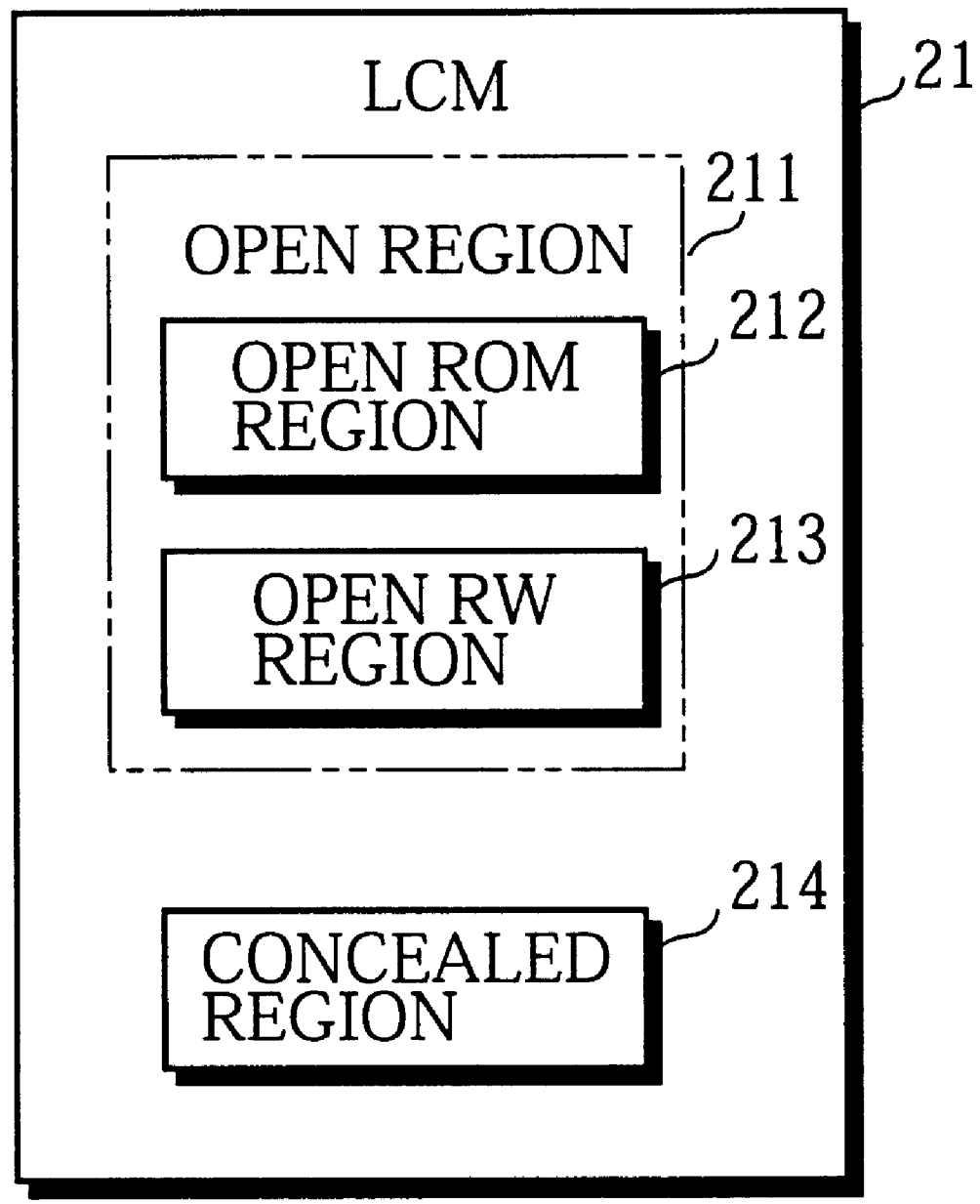
FIG. 9 shows the logical storage regions of the LCM.

FIG. 9 shows the logical storage regions provided in the LCM 21. Like the PM 13, the CDS 1, and the PD 12, the LCM 21 is provided with an open region 211, which is composed of an open ROM region 212 and an open RW region 213, and a concealed region 214 that can only be accessed using a special procedure. Identification information ID_LCM for the LCM 21 is stored beforehand in the concealed region 214 and cannot be changed. The concealed region 214 also stores a content KC for each content as required.

The PM 13 is used having been loaded into the media I/F unit 26 of the LCM 21. When reading data from or writing data onto a PM 13, the concealed region 134 of the PM 13 is accessed by the LCM 21 via the media_I/F unit 26 of the LCM 21. The media_I/F unit 26 includes a concealed region access unit (not illustrated) for accessing the concealed region 134 of the PM 13. The open RW region 213 and concealed region 214 of the LCM 21 can be provided on a flash memory, for example.

The open ROM region 212 is provided within a ROM. A program that enables mutual authentication to be performed with the PM 13 is written in this ROM. The LCM 21 operates in accordance with this program under the control of a CPU (not illustrated) to perform mutual authentication with the PM 13.

The following describes the operation of the copyright protection system 100 of the present embodiment. In the described example, the user inserts the PM 13 into the CDS 1 and selects a process that records a music content distributed by an EMD 40 onto the PM 13. This corresponds to the user purchasing the music content. In this example also, new revocation information that has been issued by an RLE (here, RLE 41) and stored in advance in the CDS 1 is recorded onto the PM 13 along with the music content.

Figure 10:
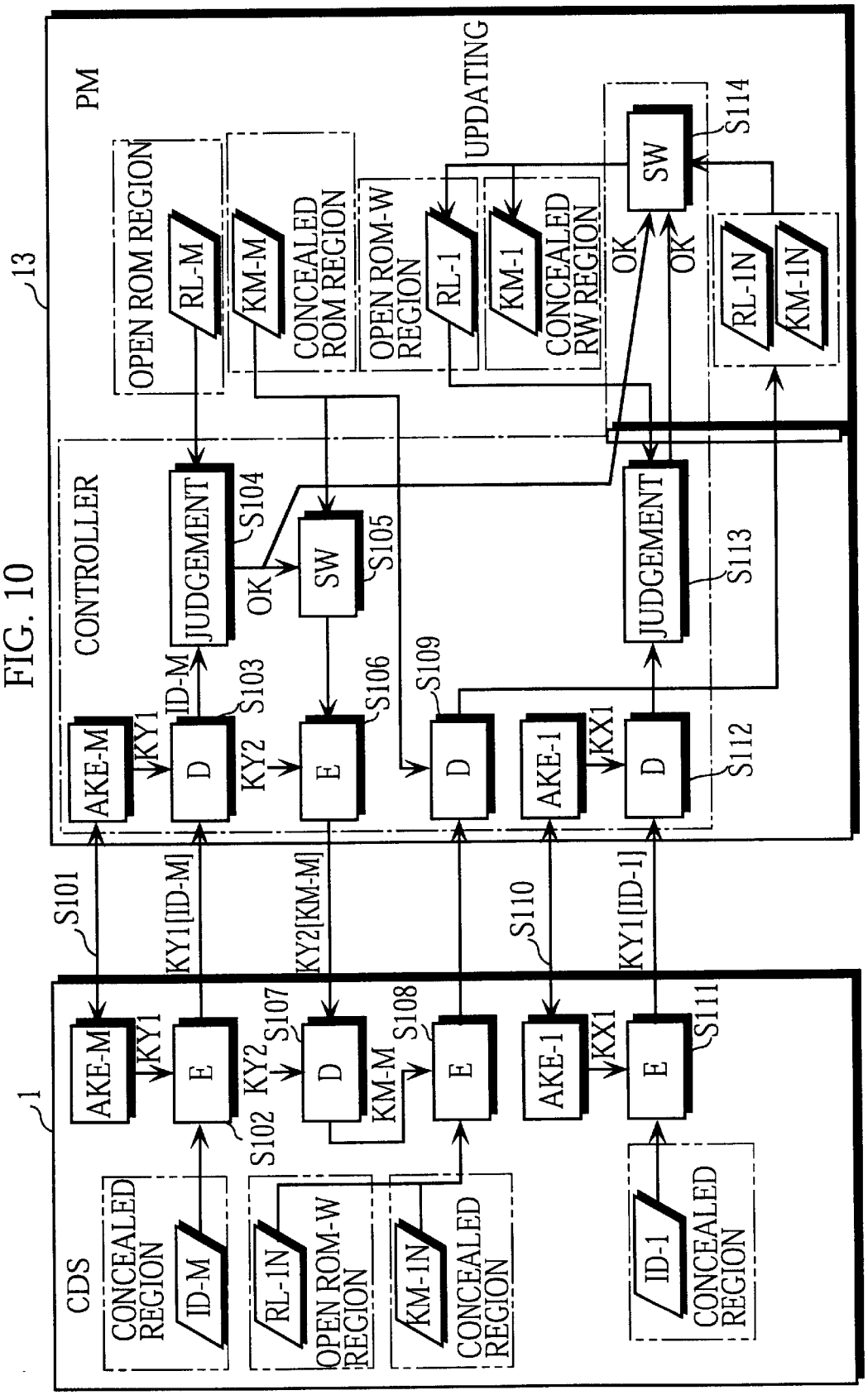
FIG. 10 shows the former part of the communication between the CDS and the PM and the processing flow.
Figure 11:
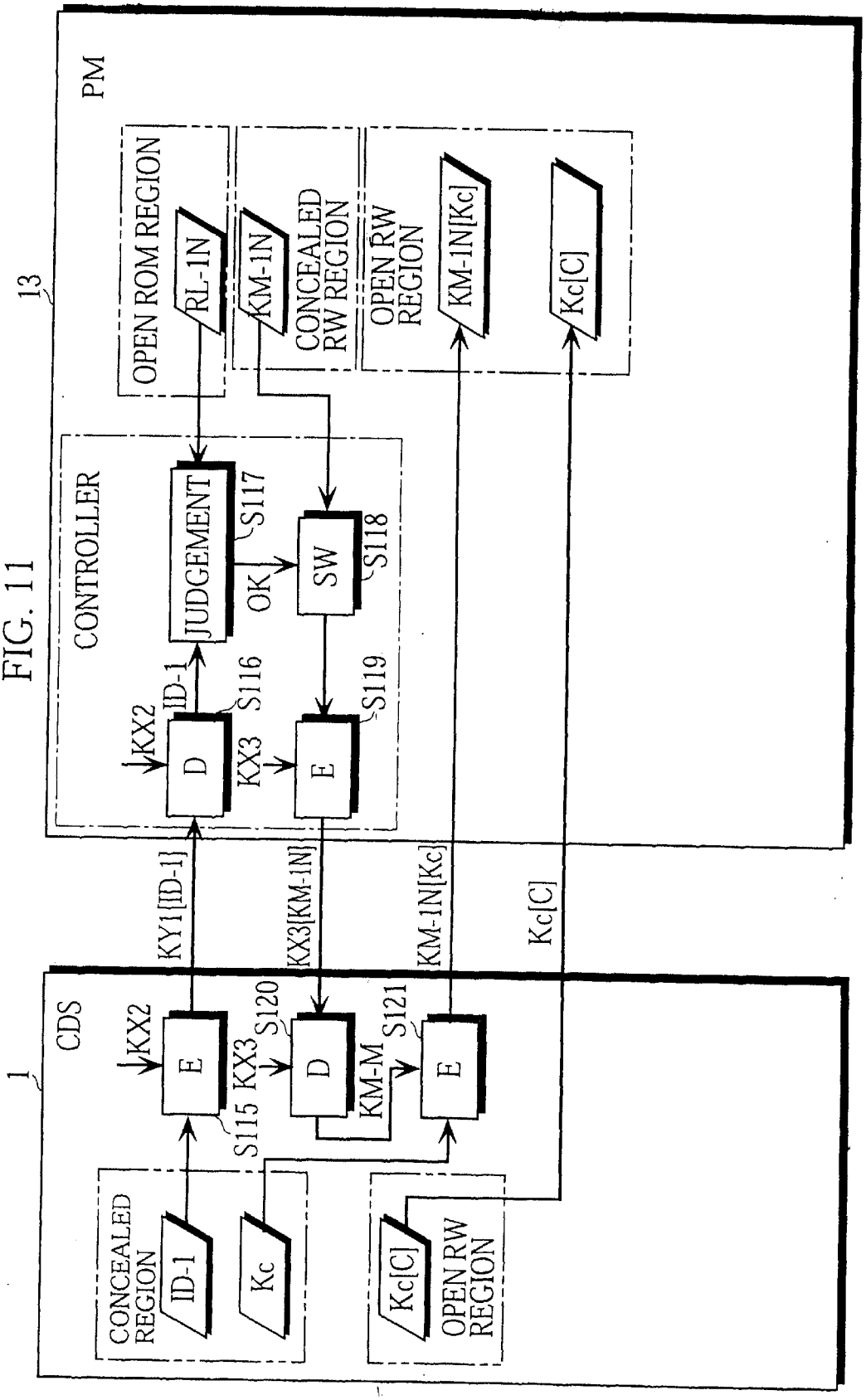
FIG. 11 shows the latter part of the communication between the CDS and the PM and the processing flow.

FIGS. 10 and 11 respectively show the former part and latter part of the communication between the CDS 1 and the PM 13 and the processing flow for the described operation.

When the user has given, via the user I/F unit 15 of the CDS 1 for example, an indication to purchase a music content and a PM 13 has been loaded into the media I/F unit 6, the media I/F unit 6 of the CDS 1 can perform mutual authentication (also known as Authentication and Key Exchange—Master (AKE-M)) with the controller 130 of the PM 13 (Step S101). This AKE-M procedure is performed by the CDS 1 and the PM 13 as follows.

First, the CDS 1 authenticates the PM 13. A CDS 1 that is allowed to update the revocation information is provided with an authentication key K1-M, as is the PM 13 (while not illustrated, these keys are stored in the concealed ROM regions). The CDS 1 generates a random number R1 and sends it to the PM 13. On receiving the random number R1 generated by the CDS 1, the PM 13 encrypts the random number R1 using the authentication key K1-M and sends the resulting encrypted random number R1 (K1-M[R1]) to the CDS 1. The CDS 1 uses the authentication key K1-M to decrypt this K1-M[R1] and, if the result is equal to the random number R1, judges that the PM 13 is a proper device.

After this, the PM 13 performs the same process for the CDS 1 to complete the mutual authentication. To do so, both the CDS 1 and the PM 13 have an authentication key K2-M, with the CDS 1 encrypting the random number R2 received from the PM 13 using this authentication key K2-M and the PM 13 decrypting this and confirming that the result is equal to the random number R2.

In the present example, the authentication keys K1-M and K2-M are only supplied to a special electronic appliance (here, the CDS 1) that is allowed to update the revocation information, so that ordinary electronic appliances (such as the LCM 21) can be prevented from executing the authentication process AKE-M.

When the CDS 1 and the PM 13 have found each other to be proper devices in the above mutual authentication AKE-M of step S101, the media I/F unit 6 of the CDS 1 and the controller 130 of the PM 13 perform key exchange to share the same session key (KY1). As one example, this session key KY1 can be a value found by taking a logical XOR for the random numbers R1 and R2 generated during the mutual authentication and then inputting the result into a secret key generation algorithm provided in advance in both the CDS 1 and the PM 13. In this way, the session key KY1 is a time-variant key whose value changes every session.

The media I/F unit 6 of the CDS 1 reads the master identification information ID-M for the CDS 1 that is concealed (stored) within the concealed region 114, encrypts this information ID-M using the session key KY-1 and sends the resulting encrypted ID-M (=KY1[ID-M]) to the PM 13 (step S102).

The controller 130 of the PM 13 decrypts this KY1[ID-M] received from the CDS 1 using the session key (KY1) that it received during the preceding key exchange and so obtains the ID-M (step S103).

Next, the controller 130 of the PM 13 uses the master identification information ID-M of the CDS 1 that it has decrypted to refer to the master revocation list RL-M in the open ROM region 132. The controller 130 judges whether the CDS 1 should be prohibited from using the PM 13 by checking whether identification information that matches the ID-M is present in the master revocation list RL-M, (step S104).

If identification information that matches the ID-M is present in the master revocation list RL-M, the controller 130 invalidates (revokes) use of the PM 13 by the CDS 1 and terminates its processing at this juncture.

On the other hand, if identification information that matches the ID-M is not present in the master revocation list RL-M, the controller 130 judges that the CDS 1 is allowed to use the PM 13 (i.e., to update the revocation information), and so reads and outputs the unique master media key KM-M that is stored in a secret fashion in the concealed ROM region 135 (step S105). The controller 130 then performs key exchange with the media I/F unit 6 of the CDS 1 to share the same session key KY-2, before encrypting the read unique master media key KM-M using this session key KY-2 and sending the resulting encrypted KM-M (=KY2[KM-M]) to the CDS 1 (step S106).

This session key KY2 can be found, for example, as the result given when the session key KY1 described earlier is inputted into a secret key generation algorithm provided in advance in the CDS 1 and the PM 13.

The media I/F unit 6 of the CDS 1 decrypts the KY2[KM-M] received from the PM 13 using the session key KY2 obtained during the preceding key exchange and so obtains the unique master media key KM-M (step S107).

Next, the media I/F unit 6 of the CDS 1 encrypts the new revocation information RL-1 stored in the open ROM-W region and the new unique media key KM-1N generated by the media I/F unit 6 using the unique master media key KM-M and sends the resulting encrypted KM-M[RL-1] and KM-M[KM-1N] to the PM 13 (step S108).

The unique media key KM-1N referred to here can be given, for example, as the output value produced when the session key KY2 described earlier is inputted into a key generation algorithm that is secretly stored in the CDS 1.

The controller 130 of the PM 13 decrypts the KM-M[RL-1] and the KM-M[KM-1N] received from the CDS 1 using the KM-M stored in the concealed ROM region 135 and so obtains RL-1 and KM-1N (step S109).

Next, the media I/F unit 6 of the CDS 1 and the controller 130 of the PM 13 perform a similar mutual authentication (AKE-1) to the mutual authentication (AKE-M) described above (step S110).

When doing so, the CDS 1 first authenticates the PM 13. To do so, both the CDS 1 and the PM 13 store the same authentication key K1-1 (which, while not illustrated, is stored in the respective concealed ROM regions). The CDS 1 generates the random number R3 and sends it to the PM 13. On receiving this random number R3, the PM 13 encrypts it using the authentication key K1-1 and sends the resulting encrypted random number (K1-1[R3]) to the CDS 1. The CDS 1 uses the authentication key K1-1 to decrypt the K1-1[R3], checks whether the decryption result is equal to the random number R3 it generated earlier, and if so, judges that the PM 13 is a proper device.

After this, the PM 13 performs the same process for the CDS 1 to complete the mutual authentication. To do so, both the CDS 1 and the PM 13 have an authentication key K2-1, with the CDS 1 encrypting a random number R4 received from the PM 13 using this authentication key K2-1 and the PM 13 decrypting this and confirming that the result is equal to the random number R4. These authentication keys K1-1 and K2-1 are only provided to electronic appliances (in this example, PD 12 and LCM 16) that are allowed to use music contents, and so can prevent electronic appliances that correspond to other application systems from performing the authentication process AKE-1.

When the CDS 1 and the PM 13 have found each other to be proper devices in the above mutual authentication AKE-1 of step S110, the media I/F unit 6 of the CDS 1 and the controller 130 of the PM 13 perform key exchange to share the same session key (KX1). As one example, this session key KX1 can be a value found by taking a logical XOR for the random numbers R3 and R4 generated during the mutual authentication and then inputting the result into a secret key generation algorithm provided in advance in both the CDS 1 and the PM 13. In this way, the session key KX1 is a time-variant key whose value changes every time.

The media I/F unit 6 of the CDS 1 reads the identification information ID-1 for the CDS 1 that is concealed (stored) within the concealed region 114, encrypts this information ID-1 using the session key KX-1 and sends the resulting encrypted ID-1 (=KX1[ID-1]) to the PM 13 (step S111).

The controller 130 of the PM 13 decrypts this KX1[ID-1] received from the CDS 1 using the session key (KX1) that it received during the preceding key exchange and so obtains the ID-1 (step S112).

Next, the controller 130 of the PM 13 uses the identification information ID-1 of the CDS 1 that it has decrypted to refer to the revocation list RL-1 in the open ROM 132. The controller 130 judges whether the CDS 1 should be prohibited from using the PM 13 by checking whether identification information that matches the ID-1 is present in the revocation list RL-1 (step S113).

If identification information that matches the ID-1 is present in the revocation list RL-1, the controller 130 invalidates (revokes) use of the PM 13 by the CDS 1 and terminates its processing at this juncture.

On the other hand, if identification information that matches the ID-1 is not present in the revocation list RL-1, the controller 130 judges that the CDS 1 is allowed to use the PM 13 (i.e., to record a content), and so updates RL-1 and KM-1 using the new revocation information RL-1N and the new unique media key KM-1N received in step S109 (step S114).

The media I/F unit 6 of the CDS 1 then performs key exchange with the controller 130 of the PM 13 to share the same session key KX2, before reading the identification information ID-1 from the concealed region 114 of the CDS 1, encrypting it using the session key KX2, and sending this encrypted ID-1 (=KX2[ID-1]) to the PM 13 (step S115). As one example, this session key KX2 can be a value found as the output given when the session key KX1 is inputted into a secret key generation algorithm provided in advance in both the CDS 1 and the PM 13.

The controller 130 of the PM 13 decrypts the KX-2[ID-1] received from the CDS 1 using the session key (KX2) obtained in the preceding key exchange, and so obtains ID-1 (step S116).

Next, the controller 130 of the PM 13 uses the decrypted identification information of the CDS 1 to refer to the new revocation list RL-1N in the open ROM region, and judges whether to prevent the CDS 1 from using the PM 13 according to whether identification information that matches ID-1 is present in the revocation list RL-1N (step S117).

If identification information that matches ID-M is present in the revocation list RL-1N, the controller 130 judges that the present CDS 1 should be prevented from using the PM 13 (i.e., "revoked") and so terminates its processing at this juncture.

On the other hand, if identification information that matches the ID-1 is not present in the master revocation list RL-1N, the controller 130 judges that the CDS 1 is allowed to use the PM 13 (i.e., to record a content), and so reads and outputs the unique media key KM-1N that is stored in a secret fashion in the concealed ROM region 135 (step S118). The controller 130 then performs key exchange with the media I/F unit 6 of the CDS 1 to share the same session key KX3, before encrypting the read unique media key KM-1N using this session key KX3 and sending the resulting encrypted KM-1N (=KX3[KM-1N]) to the CDS 1 (step S119). As one example, this session key KX3 can be a value found as the output given when the session key KX2 is inputted into a secret key generation algorithm provided in advance in both the CDS 1 and the PM 13.

The media I/F unit 6 of the CDS 1 decrypts the KX3 [KM-1N] received from the PM 13 using the session key KX3 obtained during the preceding key exchange, and so obtains the unique media key KM-1N (step S120).

The media I/F unit 6 of the CDS 1 next uses the unique media key KM-1N to encrypt the content key KC that is stored in a secret fashion in the concealed region 114, and sends the resulting encrypted KM-1N[KC] to the concealed RW region of the PM 13 (step S121).

The media I/F unit 6 of the CDS 1 sends the encrypted content KC[C] stored in the open RW region 113 to the open RW region of the PM 13 (step S122).

In this way, the method of the present embodiment allows the CDS 1 to receive the encrypted master media key KM-M from a PM 13 only if the CDS is not invalidated (revoked) according to the master revocation list RL-M. The new revocation information RL-1 stored in the open ROM region 114 and the unique media key KM-1N are encrypted using this unique master media key KM-M and are sent to the PM 13.

As a result, CDS apparatuses that should be invalidated according to the master revocation list RL-M (i.e., electronic appliances that attempt to update the revocation information of the PM 13) will definitely be invalidated (excluded). If a device is invalidated according to the revocation list RL-1, the PM 13 will not update the new revocation information RL-1 or the unique media key KM-1N. In the same way, the encrypted unique media key KM-1N will only be transferred to the CDS 1 from the PM 13 if the CDS 1 is not invalidated according to the new revocation list RL-1N. The content key KC stored in the concealed region 114 of the CDS 1 is then encrypted using the unique media key KM1-N and sent to the PM 13. In this way, CDS apparatuses that should be invalidated according to the new revocation list RL-1N (i.e., electronic appliances that attempt to use the PM 13) will definitely be invalidated (excluded).

The following describes the operation when the PD 12 decrypts and plays back an encrypted content stored in the PM 13. While this explanation focuses on the case when the content is decrypted and played back by the PD 12, exactly the same procedure is used when contents are decrypted and played back by the LCM 21.

FIG. 12 shows the communication between the PM 13 and the PD 12 and processing flow in this case.

When the user instructs the PD 12 to play back a content from a PM 13 that has been loaded into the media I/F unit 12f of the PD 12, the CPU 12a of the PD 12 and the controller 130 of the PM 13 perform a similar mutual authentication AKE-1 to step S110 (step S201). When the CDS 1 and the PM 13 have found each other to be proper devices in the mutual authentication of step S201, the CPU 12a of the PD 12 and the controller 130 of the PM 13 perform key exchange to share the same session key (KX4).

The CPU 12a of the PD 12 reads the identification information ID-PD of the PD 12 that is concealed within the concealed region 124, and encrypts the identification information ID-PD using the session key KX4. The media I/F unit 12f then sends the encrypted ID-PD (=KX4[ID-PD]) to PM 13 (step S202).

The controller 130 of the PM 13 decrypts the KX4[ID-PD] that it receives from the PD 12 using the session key KX4 it received during the preceding key exchange and so obtains the ID-PD (step S203).

The controller 130 of the PM 13 searches for the decrypted identification information ID-PD of the PD 12 in the revocation list RL-1N in the open ROM-W region and judges whether the PD 12 should be prohibited from using the PM 13 according to whether identification information that matches the ID-PD is present (step S204).

On finding identification information that matches the ID-PD in the revocation list RL-1N, the controller 130 judges that the PD 12 should be invalidated from using the PM 13 (i.e., revoked) and terminates its processing at this juncture.

On the other hand, if identification information that matches the ID-PD is not present in the revocation list RL-1N, the controller 130 judges that the PD 12 is allowed to use the PM 13, and so reads and outputs the unique media key KM-1N that is concealed in the concealed RW region 136 (step S205). The controller 130 then performs a key exchange with the CPU 12a of the PD 12 (via the media I/F unit 12f of the PD 12) to share the same session key KX5. The controller 130 encrypts the read unique media key KM-1N using this session key KX5 and sends the resulting encrypted KM-1N (=KX5[KM-1N]) to the PD 12 (step S206). This session key KX5 can be found, for example, as the result given when the session key KX4 described earlier is inputted into a secret key generation algorithm provided in advance in the PD 12 and the PM 13.

The CPU 12a of the PD 12 decrypts the KX5[KM-1N] received from the PM 13 using the session key KX5 obtained during the preceding key exchange and so obtains the unique media key KM-1N (step S207).

Next, the CPU 12a of the PD 12 reads the encrypted content key KC stored in the concealed RW region 136 of the PM 13 and decrypts it using the unique media key KM-1N obtained in step S207 (step S208). Next, the CPU 12a of the PD 12 reads the encrypted content C (=KC[C]) that is stored in the open RW region 133 of the PM 13, decrypts the encrypted content KC[C] using the content key KC obtained in step S208, and plays back the content (step S209).

In this way, the method of the present embodiment allows the PD 12 to receive the encrypted unique media key KM-1N from a PM 13 only if the PD 12 is not invalidated (revoked) according to the revocation list RL-1N. The encrypted content key (KM-1N[KC]) concealed in the concealed RW region of the PM 13 is then decrypted using the unique media key KM1-N and is used by the PD 12 to decrypt the encrypted content. In this way, PDs that should be invalidated according to the new revocation list RL-1N (i.e., electronic appliances that attempt to use the PM 13) will definitely be invalidated.

While the copyright protection system 100 of the present invention has been explained by means of the embodiment given above, it should be obvious that the present invention is not limited to the details given above.

For example, while the copyrighted digital material that is protected by the embodiment is music, video data for a movie or data for a computer program, such as game software, may also be protected.

Note that while the present embodiment describes the case where a session key (numbered KYI or KXI) is used to encrypt information that is or should be concealed in a concealed region when transferring the information between the CDS 1 and the PM 13 or between the PD 12 and the PM 13, such encryption is not absolutely necessary. However, encryption using a session key is preferable to increase the security with which contents can be protected.

In the present embodiment, the master revocation list RL-M and the revocation lists RL-1 and RL-1N are described as being registered in the open ROM region 132 or in the open ROM-W region, although such revocation lists may be stored in any region that cannot be altered. As one example, the lists may be stored in the concealed region 134 which can only be accessed according to a special procedure.

While the above embodiment describes the case where the encrypted content key (KM-1N[KC]) is stored in the concealed RW region 136, this key may instead be stored in the open RW region 133.

While the above embodiment describes the case where the identification information of an electronic appliance is transferred from the electronic appliance to a recording medium, such transfer is not limited to this direction. This is to say, a recording medium may transfer identification information to an electronic appliance.

As one example, a recording medium may store values E(ID,K1) and values E(ID,K2) in advance as the revocation information. The values E(ID,K1) are obtained by encrypting a predetermined first key K1 using the identification information ID of electronic appliances that are allowed to access contents on the recording medium. Conversely, the values E(ID,K2) are obtained by encrypting a predetermined second key K2 using the identification information ID of electronic appliances that are prohibited from accessing contents on the recording medium.

When the recording medium is attached to an electronic appliance, the recording medium sends the revocation information E described above to the electronic appliance together with a random number R.

On receiving the revocation information E and random number R, the electronic appliance decrypts the revocation information E using its own identification information. When the electronic appliance has not been revoked, this decrypting results in the electronic appliance obtaining the first key K1. Conversely, when the electronic appliance has been revoked, this decrypting results in the electronic appliance obtaining the second key K2. The electronic appliance then encrypts the random number R using the key K (K1 or K2) that is decrypting result and sends the obtained value E(K,R) to the recording medium.

The recording medium decrypts the value E(K,R) it receives and compares the result (the random number R') with the random number R it transmitted to the electronic appliance. When these values match, the recording medium allows the electronic appliance to access contents. The master revocation information may have the same content and be checked using the same procedure, and the direction used to transfer the identification information of an electronic appliance may be reversed.

What is claimed is:

1. A storage medium that is used having been loaded into an electronic appliance, the storage medium comprising:

a content storage area for storing a digital content;

a revocation information storage area for storing, as revocation information, information that corresponds to identification information of an electronic appliance that is prohibited from accessing the digital content stored in the content storage area;

a master revocation information storage area storing, as master revocation information, information that corresponds to identification information of an electronic appliance that is prohibited from updating the revocation information stored in the revocation information storage area;

content protecting means for performing a first judgment as to whether an electronic appliance into which the storage medium has been loaded has identification information that corresponds to the revocation information stored in the revocation information storage region, and allowing the electronic appliance to access the digital content stored in the content storage region only if the first judgment is negative; and revocation information updating means for performing a second judgment as to whether the electronic appliance into which the storage medium has been loaded has identification information that corresponds to the master revocation information stored in the master revocation information storage region, and allowing the electronic appliance to update the revocation information stored in the revocation information storage region only if the second judgment is negative.

2. A storage medium in accordance with claim 1, wherein the master revocation information storage region is provided in a ROM (read only memory) in which the master revocation information is stored in advance.

3. A storage medium in accordance with claim 1, further comprising:

a mutual authentication means for performing mutual authentication with the electronic appliance into which the storage medium has been loaded before the revocation information updating means performs the second judgment and, if the mutual authentication succeeds, for generating a secret key that can be shared with the electronic appliance, wherein the revocation information updating means updates the revocation information using the secret key generated by the mutual authentication means.

4. A storage medium in accordance with claim 1, wherein the revocation information updating means transmits a secret key, which the electronic appliance needs to update the revocation information, to the electronic appliance only if the second judgment is negative.

5. A storage medium in accordance with claim 1, wherein the revocation information is sorted into a plurality of groups, the revocation information storage region includes a plurality of storage areas, and each group is stored in a different storage area, and as the second judgment, the revocation information updating means judges
   (1) whether the electronic appliance into which the storage medium has been loaded as identification information that does not correspond to the master revocation information stored in the master revocation information storage region, and
   (2) whether the electronic appliance has identification information that does not correspond to the revocation information in a specified group of revocation information that the electronic appliance wishes to update, the second judgment being negative only when both (1) and (2) are affirmative, and the revocation information updating means allowing the electronic appliance to update only the revocation information in the specified group.

6. A storage medium in accordance with claim 1, wherein the revocation information storage region stores, as the revocation information, information that has been generated by encrypting a predetermined secret key using identification information of an electronic appliance that is prohibited from accessing the digital content as a key, the content protecting means transmits the revocation information stored in the revocation information storage region to the electronic appliance into which the storage medium is loaded, and judges whether information received in reply from the electronic appliance exhibits a predetermined regularity to determine whether the electronic appliance has identification information that corresponds to the revocation information stored in the revocation information storage region, the master revocation information storage region stores, as the master revocation information, information that has been generated by encrypting a predetermined secret key using identification information of an electronic appliance that is prohibited from updating the revocation information as a key, and the revocation information updating means transmits the master revocation information stored in the master revocation information storage region to the electronic appliance, and judges whether information received in reply from the electronic appliance exhibits a predetermined type of regularity so as to judge whether the electronic appliance has identification information that corresponds to the master revocation information stored in the master revocation information storage region.

7. A method for updating revocation information on a storage medium, the storage medium being used having been loaded into an electronic appliance and including (1) a content storage area for storing a digital content, (2) a revocation information storage area for storing, as revocation information, information that corresponds to identification information of an electronic appliance that is prohibited from accessing the digital content stored in the content storage area, and (3) a master revocation information storage area storing, as master revocation information, information that corresponds to identification information of an electronic appliance that is prohibited from updating the revocation information stored in the revocation information storage area, the method comprising:
  a detection step for detecting whether the storage medium has been loaded into an electronic appliance;
  a judgment step for performing a first judgment as to whether first identification information of the electronic appliance does not correspond to the master revocation information stored in the master revocation information storage region of the storage medium; and
  an updating step for updating the revocation information stored in the revocation information storage region only when the first judgment is affirmative.

8. The revocation information updating method of claim 7,
  wherein the updating step has information corresponding to second identification information of an electronic appliance stored in the revocation information storage region as new revocation information.

9. A revocation information updating method in accordance with claim 8, further comprising:
  a mutual authentication step where mutual authentication is performed between the electronic appliance and the storage medium and, only if the mutual authentication succeeds, a secret key that is to be shared by the electronic appliance and the storage medium is generated,
  wherein the updating step updates the revocation information using the secret key generated during the mutual authentication step.

10. A revocation information updating method in accordance with claim 9,
  wherein the updating step includes:
    a transfer substep for encrypting, when the first judgment is affirmative, information that corresponds to the second identification information of the electronic appliance using the secret key generated during the mutual authentication step, and having the encrypted information transferred from the electronic appliance to the storage medium; and
    a storage substep for decrypting the transferred encrypted information using the secret key and storing the information in the revocation information storage region as new revocation information.

11. A revocation information updating method in accordance with claim 8,
  wherein the judging step includes a judging substep for performing a third judgment as to whether the second identification information corresponds to the revocation information stored in the revocation information storage region, and
  when the first judgment is affirmative and the third judgment is negative, the updating step has the second identification information stored in the revocation information storage region as new revocation information.

12. A revocation information updating method in accordance with claim 8,
  wherein the master revocation information storage region stores, as the master revocation information, information produced by encrypting a special secret key using identification information of an electronic appliance that is prohibited from updating the revocation information as a key, and
  the judging step transmitting the master revocation information stored in the master revocation information storage region to the electronic appliance into which the storage medium has been loaded and judging whether the identification information of the electronic appliance corresponds to the master revocation information stored in the master revocation information restricted region on the storage medium by judging whether a response received from the electronic appliance exhibits a predetermined type of regularity.

13. A revocation information updating apparatus for updating revocation information on a storage medium, the storage medium being used having been loaded into an electronic appliance and including (1) a content storage area for storing a digital content, (2) a revocation information storage area for storing, as revocation information, information that corresponds to identification information of an electronic appliance that is prohibited from accessing the digital content stored in the content storage area, and (3) a master revocation information storage area storing, as master revocation information, information that corresponds to identification information of an electronic appliance that is prohibited from updating the revocation information stored in the revocation information storage area,
  the apparatus comprising:
    a first identification information storage means for storing first identification information that does not correspond to the master restricted region stored in the master revocation information storage region of the storage medium;
    a permission obtaining means for obtaining, using information corresponding to the first identification information stored in the first identification information storage means, permission from the storage medium to update the revocation information stored on the storage medium; and
    updating means for updating the revocation information stored on the storage medium in accordance with the permission obtained by the permission obtaining means.

14. A revocation information updating apparatus in accordance with claim 13,
  wherein the updating means updates the revocation information using information that is stored beforehand and corresponds to second identification information.

15. A revocation information updating apparatus in accordance with claim 14, further comprising:
  a mutual authentication means for performing mutual authentication with the storage medium before the permission obtaining means tries to obtain permission to update the revocation information and, only when the mutual authentication has succeeded, generating a secret key that can be shared with the storage medium,
  wherein the updating means updates the revocation information using the secret key generated by the mutual authentication means.

16. A revocation information updating apparatus in accordance with claim 15, further comprising:
  wherein the updating means updates the revocation information by encrypting new revocation information corresponding to the second identification information using the secret key generated by the mutual authentication means and has the encrypted information transferred from the electronic appliance to the storage medium.

17. A revocation information updating apparatus in accordance with claim 14,
  wherein the revocation information is sorted into a plurality of groups and the revocation information storage region includes a plurality of storage regions that each store a different group, the updating means only updating the revocation information in a group that corresponds to the second identification information.

18. A revocation information updating apparatus in accordance with claim 14, wherein the master revocation information storage region stores, as the master revocation information, information produced by encrypting a predetermined secret key using identification information of an electronic appliance that is prohibited from updating the revocation information as a secret key, and the permission obtaining means obtaining the permission by receiving the master revocation information sent from the storage medium, decrypting the master revocation information using the first identification information of the electronic appliance, and sending a decrypted result and information that exhibits a predetermined type of regularity to the storage medium.

* * * * *

UNITED STATES PATENT AND TRADEMARK OFFICE
CERTIFICATE OF CORRECTION

PATENT NO.     : 6,581,160 B1
DATED          : June 17, 2003
INVENTOR(S)    : Shunji Harada et al.

It is certified that error appears in the above-identified patent and that said Letters Patent is hereby corrected as shown below:

<u>Title page,</u>
Item [73], should read:
-- [73] Assignee: Matsushita Electric Industrial Co., Ltd., Osaka (JP) and Kabushiki Kaisha Toshiba, Kanagawa-ken (JP) --

Signed and Sealed this

Eighteenth Day of November, 2003

JAMES E. ROGAN
*Director of the United States Patent and Trademark Office*